(12) United States Patent
Ericson et al.

(10) Patent No.: US 12,425,842 B2
(45) Date of Patent: Sep. 23, 2025

(54) APPARATUSES AND METHODS FOR 2-HOP COOPERATIVE GROUP TRANSMISSIONS

(71) Applicant: Telefonaktiebolaget LM Ericsson (publ), Stockholm (SE)

(72) Inventors: Mårten Ericson, Gammelstad (SE); Min Wang, Luleå (SE); Jan Christoffersson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 694 days.

(21) Appl. No.: 17/767,126

(22) PCT Filed: Oct. 11, 2019

(86) PCT No.: PCT/SE2019/051002
§ 371 (c)(1),
(2) Date: Apr. 7, 2022

(87) PCT Pub. No.: WO2021/071404
PCT Pub. Date: Apr. 15, 2021

(65) Prior Publication Data
US 2022/0377534 A1   Nov. 24, 2022

(51) Int. Cl.
*H04W 8/26* (2009.01)
*H04B 7/026* (2017.01)
(Continued)

(52) U.S. Cl.
CPC .............. *H04W 8/26* (2013.01); *H04B 7/026* (2013.01); *H04W 60/04* (2013.01); *H04W 76/14* (2018.02); *H04W 76/27* (2018.02); *H04W 68/02* (2013.01)

(58) Field of Classification Search
CPC ... H04W 72/121; H04W 72/20; H04W 84/12; H04W 4/08; H04W 16/28; H04B 7/0426;
(Continued)

(56) References Cited

U.S. PATENT DOCUMENTS

2013/0029680 A1*  1/2013  Park .................... H04W 72/20
                                                           455/450
2015/0230224 A1   8/2015  Maaref et al.
(Continued)

FOREIGN PATENT DOCUMENTS

WO     2015163798 A1    10/2015

OTHER PUBLICATIONS

Elmenreich, W., et al., "Building Blocks of Cooperative Relaying in Wireless Systems", University of Klagenfurt, Springer Journal 125, Aug. 14, 2008, 1-9.
(Continued)

*Primary Examiner* — Kwang B Yao
*Assistant Examiner* — Syed M Bokhari
(74) *Attorney, Agent, or Firm* — Weisberg I.P. Law, P.A.

(57) ABSTRACT

The present disclosure relates to telecommunications. In one of its aspects, the disclosure concerns a method in a source User Equipment (UE) for group transmissions in a wireless communications system comprising a group of UEs, including the source UE. The group is assigned a first group IDentity (ID). The source UE has data to be cooperatively transmitted by the group of UEs in a group transmission to a Radio Access Network (RAN) node. The method comprises transmitting, to the group of UEs, a SideLink (SL) message. The SL message comprises the data to be transmitted to the RAN node, a source UE ID identifying the source UE, the first group ID identifying the group of UEs receiving the data and an indicator indicating that the data comprised in the SL message is to be transmitted cooperatively by the group of UEs in a group transmission to the RAN node.

11 Claims, 13 Drawing Sheets

(51) Int. Cl.
  *H04W 60/04* (2009.01)
  *H04W 76/14* (2018.01)
  *H04W 76/27* (2018.01)
  *H04W 68/02* (2009.01)

(58) Field of Classification Search
  CPC ...... H04B 7/0452; H04B 7/0456; H04B 7/06; H04L 27/26
  USPC .......................................... 370/329
  See application file for complete search history.

(56) References Cited

U.S. PATENT DOCUMENTS

| | | | |
|---|---|---|---|
| 2016/0128123 A1 | 5/2016 | Li | |
| 2017/0257898 A1* | 9/2017 | Maaref | H04W 8/186 |
| 2017/0318615 A1 | 11/2017 | Ou et al. | |
| 2017/0339530 A1 | 11/2017 | Maaref | |
| 2018/0020382 A1* | 1/2018 | Kim | H04W 8/22 |
| 2018/0103454 A1* | 4/2018 | Le Thierry D'Ennequin | H04L 67/567 |
| 2018/0198465 A1 | 7/2018 | Ericson et al. | |
| 2019/0020381 A1 | 1/2019 | Tooher et al. | |
| 2019/0208539 A1 | 7/2019 | Christoffersson et al. | |
| 2019/0342910 A1* | 11/2019 | Cao | H04W 72/23 |
| 2020/0163005 A1* | 5/2020 | Rao | H04W 4/44 |

OTHER PUBLICATIONS

Huawei, et al., "Further views on Rel-17 work area on NR sidelink enhancements for V2X and other use cases", 3GPP TSG RAN Meeting #85, RP-191831, Newport Beach, USA, Sep. 16-20, 2019, 1-13.

Jung, Sunghoon, et al., "A new way of extending network coverage: Relay-assisted D2D communications in 3GPP", ICT Express 2, <www.elsevier.com/locate/icte>, 2016, 117-121.

* cited by examiner

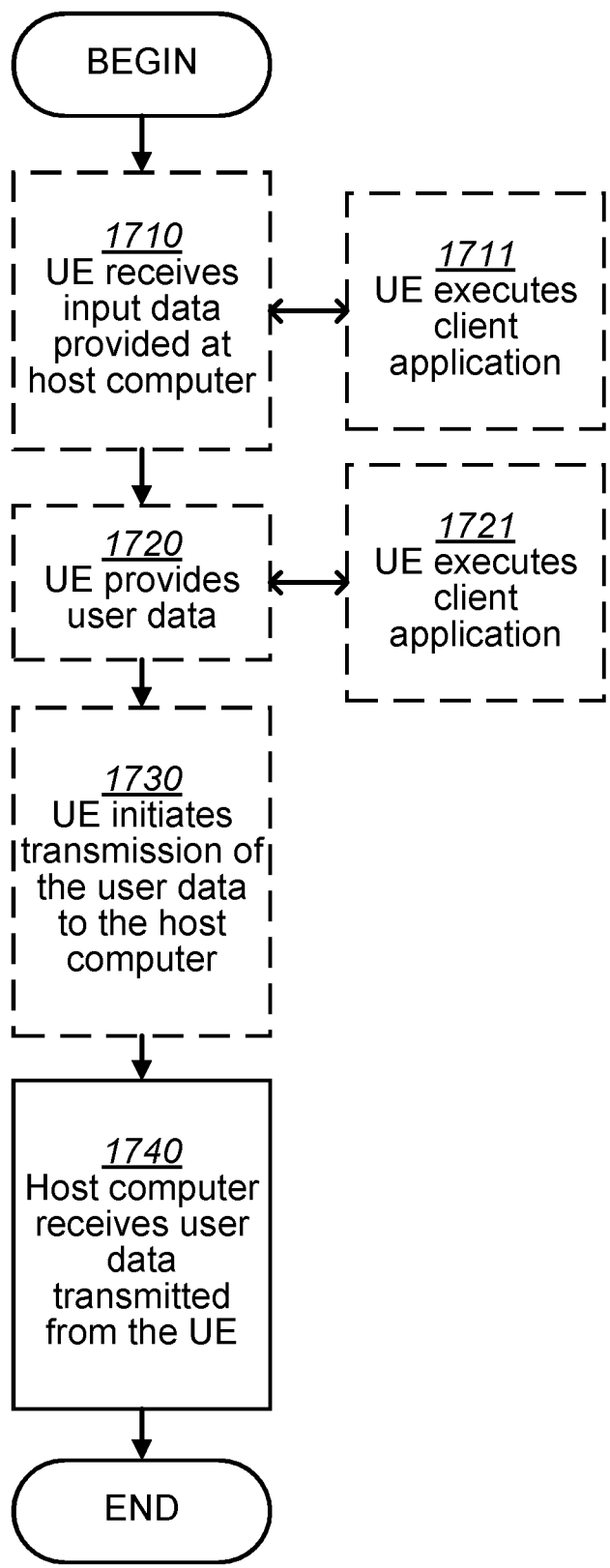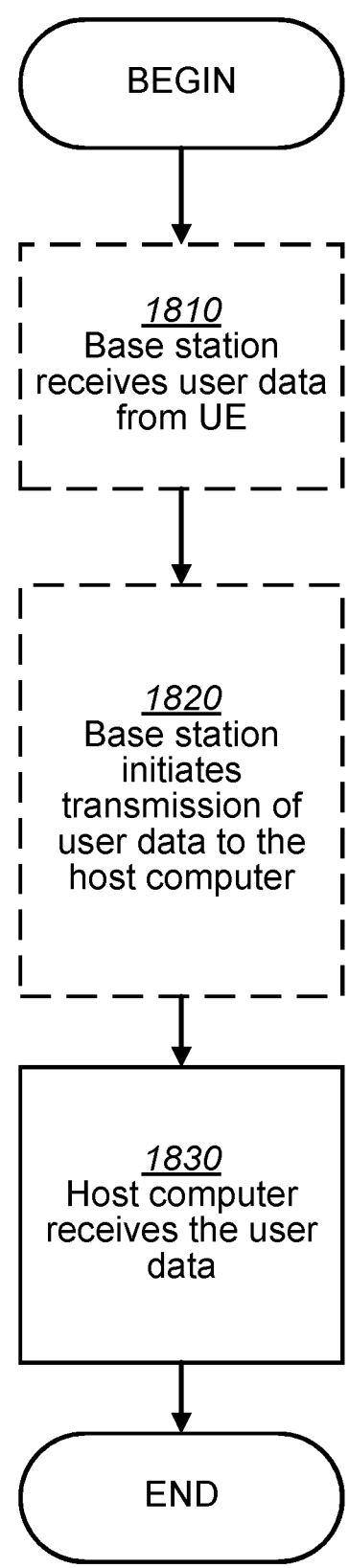
Fig. 17
Fig. 18

APPARATUSES AND METHODS FOR 2-HOP COOPERATIVE GROUP TRANSMISSIONS

TECHNICAL FIELD

The present disclosure generally relates to telecommunications. In particular, the various embodiments described in this disclosure relate to apparatuses and methods for group transmissions in a wireless communications system.

BACKGROUND

This section is intended to provide a background to the various embodiments of the invention that are described in this disclosure. Therefore, unless otherwise indicated herein, what is described in this section should not be interpreted to be prior art by its mere inclusion in this section.

To receive service from a network, a User Equipment (UE) has to perform an attach procedure to the network, i.e. register itself to the network. To register itself to the network, the UE has to be associated with an Identity (ID), such that the network may differentiate between different UEs.

An International Mobile Subscriber Identity (IMSI) is a number that uniquely identifies every UE of a cellular network. However, due to security reasons the IMSI should not be transmitted in the network if it can be avoided. Therefore, several temporary identities for the UEs are used.

A Temporary Mobile Subscriber Identity (TMSI) is one temporary ID. It is, in a very simplified view, used to identify the UE with the Mobile Management Entity (MME). A Globally Unique Temporary Identifier (GUTI) consist of the TMSI and an ID called GUMMEI, which is an abbreviation for Globally Unique Mobility Management Entity Identifier. The GUMMEI uniquely identifies the MME that has allocated the GUTI. The UE uses the GUTI to identify to which MME a re-establish request should be sent. If the UE has moved from a Universal Mobile Telecommunications System (UMTS) cell to a Long Term Evolution (LTE) cell, the UE does not have its GUTI and a Tracking Area Update procedure is performed. A Packet TMSI (P-TMSI) is sent. In accordance with this, the MME, which is in control of the area to which the UE moved, can contact a Serving GPRS (General Packet Radio Service) Support Node (SGSN), which is in control of the area where the UE previously was, to request the current profile, e.g. IP address and default bearers. The situation is similar when a UE has moved from an LTE cell to a UMTS cell. The GUTI is sent as the P-TMSI parameter and the procedure is referred as Routing Area Update (RAU).

Other examples of identifiers are Radio Network Temporary Identifiers (RNTIs). Example of such IDs are Cell-RNTI (C-RNTI), Temporary C-RNTI (TC-RNTI) and Random Access RNTI (RA-RNTI). The RNTIs are temporary identifiers for the UE when it communicates with the Radio Access Network (RAN), i.e. the Base Station (BS).

As previously described, the UE has to perform an attach procedure to the network to receive services from the network. However, before that, the UE has to make a first random access; such process is illustrated in FIG. 1. The Random Access CHannel (RACH) is designed to achieve uplink time synchronization for a UE that has not yet acquired or has lost its uplink synchronization.

When a UE attempts to establish a radio link, it selects a RACH preamble randomly and requests a random access to the BS, e.g. an eNB or a gNB. Thus, the first message (Msg1) transmitted by the UE to the BS is a RACH preamble, illustrated as step 11 in FIG. 1. Another UE may have selected the same RACH preamble and therefore there is a risk of collision, i.e. contention-based RACH. In case of collision, the UE that loses the contention will have to re-initiate the random access with reselected preambles. The RACH access gives an identity of the UE to the network so that the network can address the UE in a next step. The identity, which the UE will use, is the RA-RNTI. The RA-RNTI is determined from the time slot number in which the preamble is sent. If the UE does not receive any response from the network within a given time window, it will ramp up its power and send another RACH preamble.

The BS responds with a Random Access Response (RAR) to the UE on a DownLink Shared CHannel (DL-SCH) addressed to the RA-RNTI, illustrated as step 12, Msg2, in FIG. 1. The response is calculated from the timeslot in which the preamble was sent. The response message carries a TC-RNTI, a timing advance value and an uplink grant resource for the next Radio Resource Control (RRC) signalling message. The BS informs the UE to adjust its timing by the timing advance value to compensate for the propagation delay caused by UE distance from the BS. The network, i.e. the BS, assigns initial resources and uplink grant resources to the UE so that the UE can use an UpLink Shared CHannel (UL-SCH) to transmit an RRC connection request message in a next step.

In step 13, the UE sends the RRC connection request message (Msg3) to the BS using the UL-SCH. The UE is identified by the TC-RNTI, which was received in the RAR message in step 12. The message further contains a UE identity, i.e. a TMSI or a random value, and a connection establishment cause value, which indicates the purpose of the UE to request the setup of the RRC connection.

A TMSI is used if the UE previously has connected to the same network. With the TMSI value, the UE is identified in the core network. A random value is used if the UE is connecting to the network for the first time. The random value, or the TMSI, helps to distinguish between UEs when the same TC-RNTI has been assigned to more than one UE, i.e. when a collision has occurred.

Thereafter, if the RRC connection request was successfully received, the BS responds with a contention resolution message to the identified UE, illustrated as step 14 (Msg4) in FIG. 1. A corresponding Physical Downlink Control CHannel (PDCCH) transmission is addressed to the TC-RNTI, which has been assigned to UE in the RACH response. The UE identity, i.e. the TMSI or the random value, is also included in the message's Medium Access Control (MAC) Control Element (CE), indicating the success of contention resolution. The TC-RNTI is promoted to C-RNTI, which will be used by the UE for further communication.

After the random access procedure has been performed, a registration procedure, called an attach procedure in LTE, is started. A simplified signalling diagram for this procedure is also illustrated in FIG. 1. The registration procedure is performed in order for the UE to receive services from the network, i.e. to set-up a UE context and configure the bearers such that the UE can connect to the internet, or to make a phone or video call. The registration procedure is typically only performed when the UE is turned on.

The MME in LTE Core Network (called Evolved Packet Core (EPC)), or the corresponding function in the New Radio (NR) Core Network (5GC) (called the Access and Mobility management Function (AMF)), creates a UE context when a UE is turned on and registers to the network, i.e. the wireless communications system. It assigns a unique short temporary identity, a System architecture evolution- Temporary Mobile Subscriber Identity (S-TMSI), to the UE. The identity identifies the UE context in the AMF, or in the MME. The UE context holds user subscription information downloaded from the Home Subscriber Server (HSS).

When a UE makes a registration to the network a mutual authentication of the UE and the network is performed between the UE and the AMF/HSS, or MME/HSS in LTE. This authentication function also establishes the security keys that are used for encryption of the bearers.

The registration procedure in NR is very similar to the attach procedure in LTE, except that the attach procedure and bearer setup are separated. This split is done because the registration to the network is done by the AMF and a Session Management Function (SMF) does the session management, such as bearer setup.

SUMMARY

Device-to-Device (D2D) communication in cellular networks is defined as direct communication between two User Equipment (UEs) without traversing the Base Station (BS) or core network. By using D2D group communication, uplink coverage and user bit rate may be increased, for example in a high frequency 5G, or New Radio (NR), network. Transmission reliability for UEs in bad coverage may be improved. When a UE has data to transmit, it may first distribute this data to neighbouring UEs over D2D or SideLink (SL). The neighbouring UEs may be assigned to a group, into which also the UE with data to transmit is included. In a second step, the UEs in the group may cooperatively transmit the data over a cellular UpLink (UL) to a Base Station (BS). The cooperative transmission may increase the UL coverage e.g. by combining several UEs total output power and may be beneficial from a latency point of view compared to repeated transmissions for coverage, as used e.g. in Long Term Evolution (LTE) narrowband.

A 2-hop group transmission concept, i.e. where data first is transmitted over SL to the group and thereafter cooperatively transmitted over cellular UL, is illustrated in FIGS. 2a and 2b. FIGS. 2a and 2b show a UE in a group that wants to transmit data through the group. FIG. 2a illustrates the first step, i.e. the 1st hop, where the UE sends its data over the SL to the other UEs in the group. FIG. 2b illustrates the second step, i.e. the 2nd hop, where the data is sent in a synchronized manner from the UEs in the group over the cellular UL to a network node or BS, e.g. an eNB or a gNB. In DownLink (DL), the network may transmit data to the group as if the group was a single UE. At least one UE in the group must be able to receive the DL data, and if necessary, the DL data may be relayed to the other UEs in the group via D2D. This technique is also known as cooperative relaying or Virtual Antenna Array.

Proximity-based Services (ProSe) is one example of technology that may be used to transmit data within a group of UEs. ProSe is a D2D technology that allows LTE UEs to detect each other and to communicate directly. In ProSe, SLs are used. As previously described, by using SL relaying, network coverage for a UE may be extended. If an UE is out of coverage, the UE may connect to another UE closer to the BS, which is in coverage. The remote UE may then use SL to relay data to the closer UE, which thereafter forwards the data to the BS.

A User Plane (UP) protocol for SL relay is illustrated in FIG. 3. As shown in the figure, the relay UE has two radio interfaces to the BS, i.e. the eNB, and to the remote UE, respectively. The PC5-U interface may be used to transmit data to the remote UE, and the Uu interface may be used to transmit data to the eNB. The relay UE relays data, i.e. IP packets, between the remote UE and the network at the IP layer.

To identify a transmitting UE and a ProSe group for which the data packet is intended, two identities are provided in each message. These identities are the ProSe UE ID and the ProSe Layer-2 Group ID. They are either provided by the network or preconfigured in the UE. The ProSe UE ID is a group member IDs and has a length of 24 bits. It is used in each MAC PDU as a source. The ProSe Layer-2 Group ID is used to identify the group and has a length of 24 bit. Together with the logical channel ID, the ProSe UE ID and the ProSe Layer-2 Group ID identify the Packet Data Convergence Protocol (PDCP)/Radio Link Control (RLC) pair to be used in the receiving UE. One UE generally has different Group Member IDs in different groups.

The header of the sidelink shared channel is illustrated in FIG. 4. The transmitting UE is the source and associated with field 42. The receiver is the destination and associated with field 43 in FIG. 4. Field 41, named V, is the version number. The bits named R in the fields 44 are reserved bits and may be used for later releases. The Source field 42 is identical to the ProSe UE ID and has a length of 24 bits. The Destination field 43 is identical to the ProSe Layer-2 Group ID and indicates the receiver group. Using the Destination field 43, the UE can drop data packets at the MAC layer.

The existing Proximity-based Services (ProSe) concept, i.e. LTE Device-to-Device (D2D), has some limitations. It cannot support 2-hop cooperative group transmission because it cannot handle the identities of the group of UEs performing the 2-hop group transmission. The group of UEs does not know if data received from one group member should be transmitted only to the internal group or if it should be transmitted further via a cellular link to a BS, i.e. the 2nd hop illustrated in FIG. 2b. Furthermore, if the group of UEs transmits data to the BS, there is no possibility for the BS to identify the originating UE, i.e. the source UE, and which bearers that should be used for the 2nd hop cooperative group transmission. Accordingly, there is a need for a way of handling identities of UEs and group of UEs when performing group transmissions in order to support 2-hop cooperative group transmission.

It is in view of the above background and other considerations that the various embodiments of the present disclosure have been made.

It is proposed to provide a solution to address this problem, i.e. providing a process for group transmissions where the identities of the UEs and group of UEs are handled when group transmissions are performed such that 2-hop cooperative group transmissions are supported.

This general object has been addressed by the appended independent claims. Advantageous embodiments are defined in the appended dependent claims.

According to a first aspect, there is provided a method in a source UE for group transmissions in a wireless communications system. The wireless communications system comprises a group of UEs, including the source UE. The group of UEs is assigned a first group IDentity (ID). The source UE has data to be cooperatively transmitted by the group of UEs in a group transmission to a Radio Access Network (RAN) node.

The method comprises transmitting, to the group of UEs, a SideLink (SL) message. The SL message comprises data to be transmitted to the RAN node and a source UE ID identifying the source UE. The SL message further comprises the first group ID identifying the group of UEs receiving the data and an indicator indicating that the data comprised in the SL message is to be transmitted cooperatively by the group of UEs in a group transmission to the RAN node.

In some embodiments, the method further comprises creating a group message, based on the SL message. The group message is created by scrambling the data comprised in the SL message with a second group ID identifying the group of UEs and adding the source UE ID to the group message. The method further comprises transmitting, cooperatively with the UEs assigned to the group, the group message to the RAN node.

In some embodiments, the first group ID is the same identifier as the second group ID.

In some embodiments, the second group ID is a group Cell-Radio Network Temporary Identifier (C-RNTI).

In some embodiments, the group message is transmitted to the RAN node via a group radio bearer over a Uu interface.

In some embodiments, the source UE is in a connected mode. The source UE ID is a Prose UE ID. Alternatively, the source UE ID is the source UE's C-RNTI. In other embodiments, the source UE is in an inactive mode and the source UE ID is a resume request ID. In still other embodiments, the source UE is out-of-coverage and the source UE does not have any bearer setup, then the source UE ID is a Temporary Mobile Subscriber Identity (TMSI).

According to a second aspect, there is provided a method in a RAN node for group transmissions in a wireless communications system. The wireless communications system comprises a group of UEs, including a source UE. The source UE has data to be cooperatively transmitted by the group of UEs in a group transmission to the RAN node.

The method comprises receiving group messages, from the UEs assigned to the group. The group messages comprise data scrambled with a second group ID identifying the group of UEs and a source UE ID identifying the source UE of the received data.

In some embodiments, the second group ID is a group C-RNTI.

In some embodiments, the group messages, received from the UEs assigned to the group, are received via a group radio bearer over a Uu interface.

In some embodiments, the method further comprises forwarding, to a Core Network (CN) node, the data comprised in the received group messages.

In some embodiments, the source UE ID indicates that the source UE is in a connected mode and the received data is forwarded to the CN node using the source UE's bearers. In other embodiments, wherein the source UE ID is a resume request ID and indicates that the source UE is in an inactive mode, the received data is forwarded to the CN node using the source UE's active bearers. In still other embodiments, wherein the source UE ID is a TMSI and indicates that the source UE is in out-of-coverage, the received data is forwarded to the CN node using the group bearers.

According to a third aspect, there is provided a source UE configured to perform the method according to the first aspect.

The source UE is configured for group transmissions in a wireless communications system. The wireless communications system comprises a group of UEs, including the source UE. The group of UEs is assigned a first group ID. The source UE has data to be cooperatively transmitted by the group of UEs in a group transmission to a RAN node. The source UE comprises a processing circuitry and a memory circuitry. The memory circuit stores computer program code which, when run in the processing circuitry, causes the source UE to transmit, to the group of UEs, an SL message. The SL message comprises the data to be transmitted to the RAN node and a source UE ID identifying the source UE. The SL message further comprises the first group ID identifying the group of UEs receiving the data and an indicator indicating that the data comprised in the SL message is to be transmitted cooperatively by the group of UEs in a group transmission to the RAN node.

In some embodiments, the second group ID is a group C-RNTI.

In some embodiments, the first group ID and the second group ID are the same IDs.

In some embodiments, the memory circuitry storing computer program code which, when run in the processing circuitry, further causes the source UE to create a group message, based on the SL message. The group message is created by scrambling the data comprised in the SL message with a second group ID identifying the group of UEs and adding the source UE ID to the group message. The source UE is further caused to transmit, cooperatively with the UEs assigned to the group, the group message to the RAN node.

In some embodiments, the group message is transmitted to the RAN node via a group radio bearer over a Uu interface.

In some embodiments, the source UE is in a connected mode and the source UE ID is a Prose UE ID. Alternatively, the source UE ID is the source UE's C-RNTI. In other embodiments, the source UE is in an inactive mode and the source UE ID is a resume request ID. In still other embodiments, the source UE is out-of-coverage and the source UE does not have any bearer setup, the source UE ID is a TMSI.

According to a fourth aspect, there is provided a RAN node configured to perform the method according to the second aspect.

The RAN node is configured for group transmissions in a wireless communications system. The wireless communications system comprises a group of UEs, including a source UE. The source UE has data to be cooperatively transmitted by the group of UEs in a group transmission to the RAN node. The RAN node comprises a processing circuitry and a memory circuitry. The memory circuit stores computer program code which, when run in the processing circuitry, causes the RAN node to receive group messages, from the UEs assigned to the group. The group messages comprise data scrambled with a second group ID identifying the group of UEs and a source UE ID identifying the source UE of the received data.

In some embodiments, the second group ID is a group C-RNTI.

In some embodiments, the group messages, received from the UEs assigned to the group, are received via a group radio bearer over a Uu interface.

In some embodiments, the memory circuitry storing computer program code which, when run in the processing circuitry, further causes the RAN node to forward, to a CN node, the data comprised in the received group messages.

In some embodiments, the source UE ID indicates that the source UE is in a connected mode and the received data is forwarded to the CN node using the source UE's bearers. In other embodiments, wherein the source UE ID is a resume request ID and indicates that the source UE is in an inactive mode, the received data is forwarded to the CN node using the source UE's active bearers. In still other embodiments, wherein the source UE ID is a TMSI and indicates that the source UE is in out-of-coverage, the received data is forwarded to the CN node using the group bearer.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

The various proposed embodiments herein provide a solution for supporting 2-hop group transmissions by handling the identifiers of the UEs and the group of UEs in group transmissions performed in a wireless communications system.

BRIEF DESCRIPTION OF THE DRAWINGS

These and other aspects, features and advantages will be apparent and elucidated from the following description of various embodiments, reference being made to the accompanying drawings, wherein:

FIGS. 17 and 18 show example methods implemented in a communication system including a host computer, a base station and a user equipment.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

In one of its aspects, the disclosure presented herein concerns a method in a source User Equipment (UE) for group transmissions in a wireless communications system.

Figure 1:
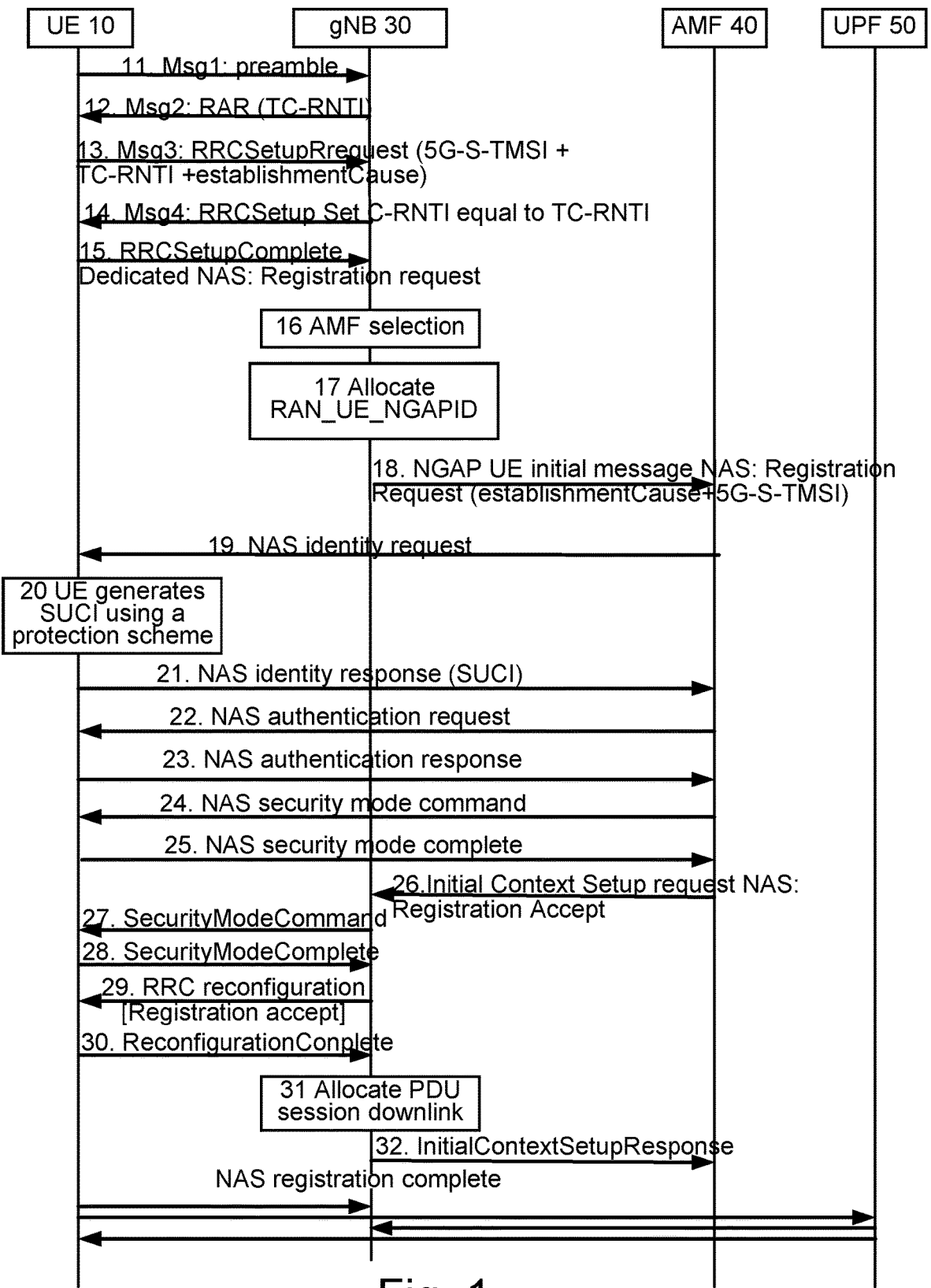
FIG. 1 illustrates a RACH procedure and a registration procedure.
Figure 2A:
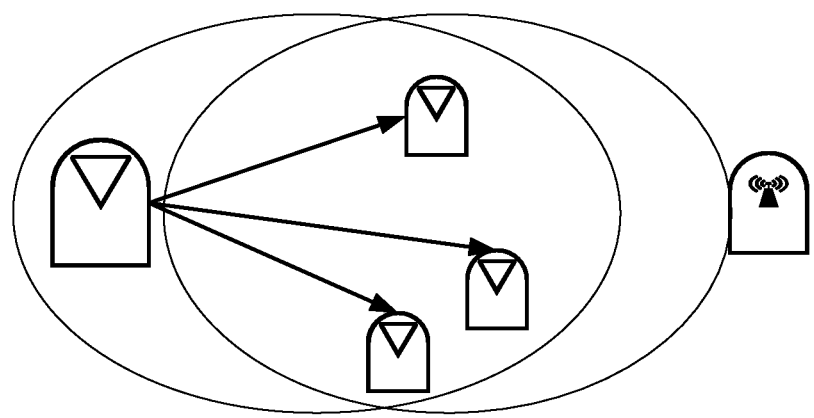
FIGS. 2a and 2b show schematic figures of 2-hop group communication.
Figure 2B:
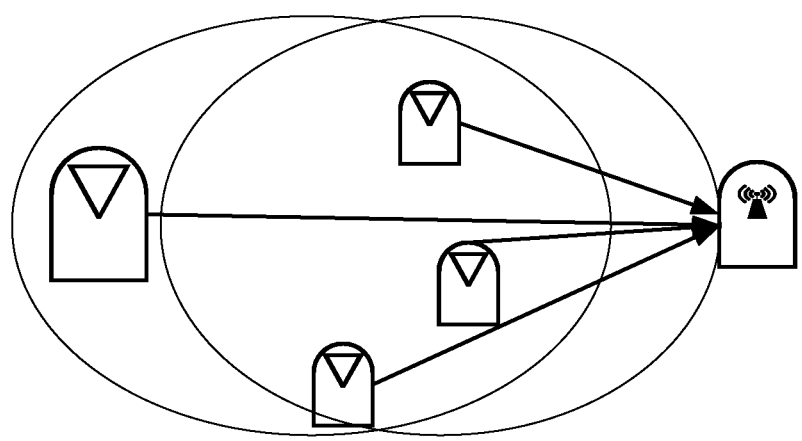
Figure 3:
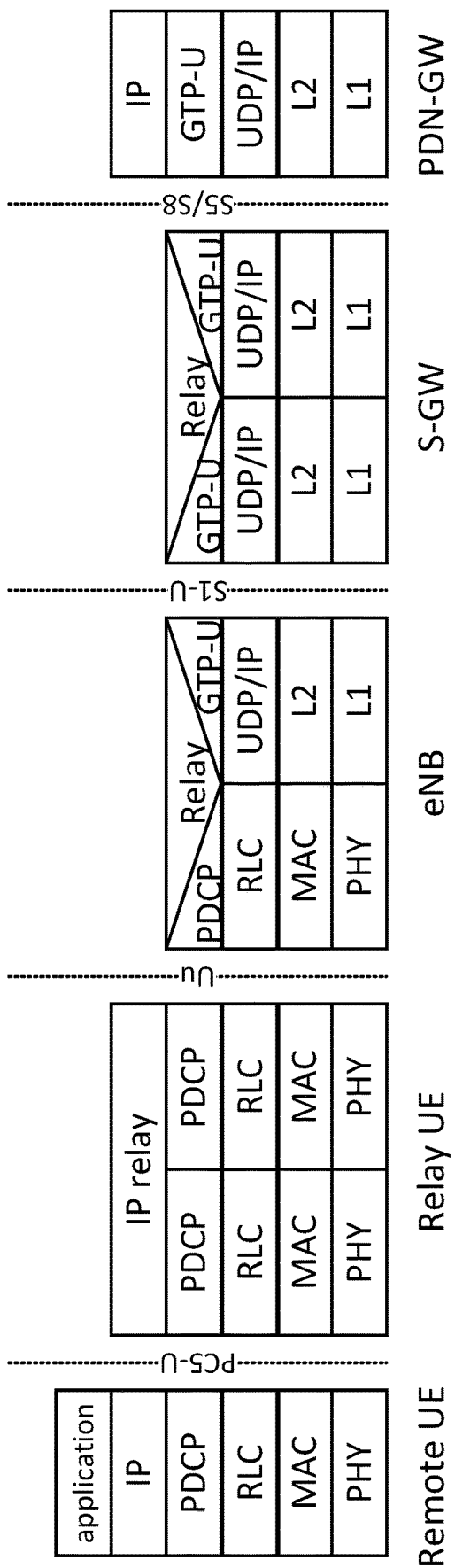
FIG. 3 shows sidelink relaying UP protocol.
Figure 4:
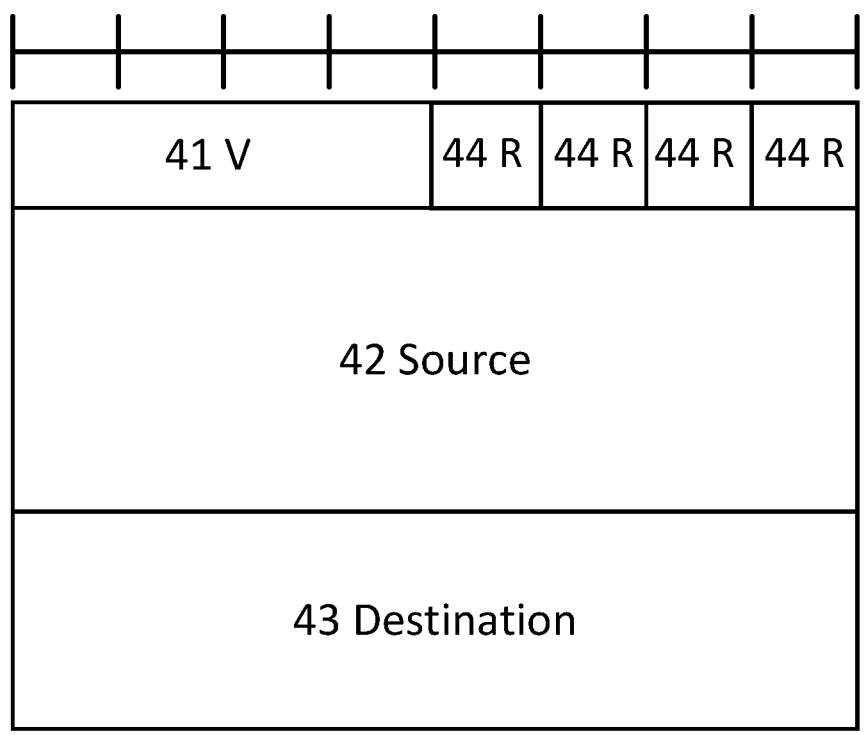
FIG. 4 illustrates an SL-SCH header.
Figure 5A:
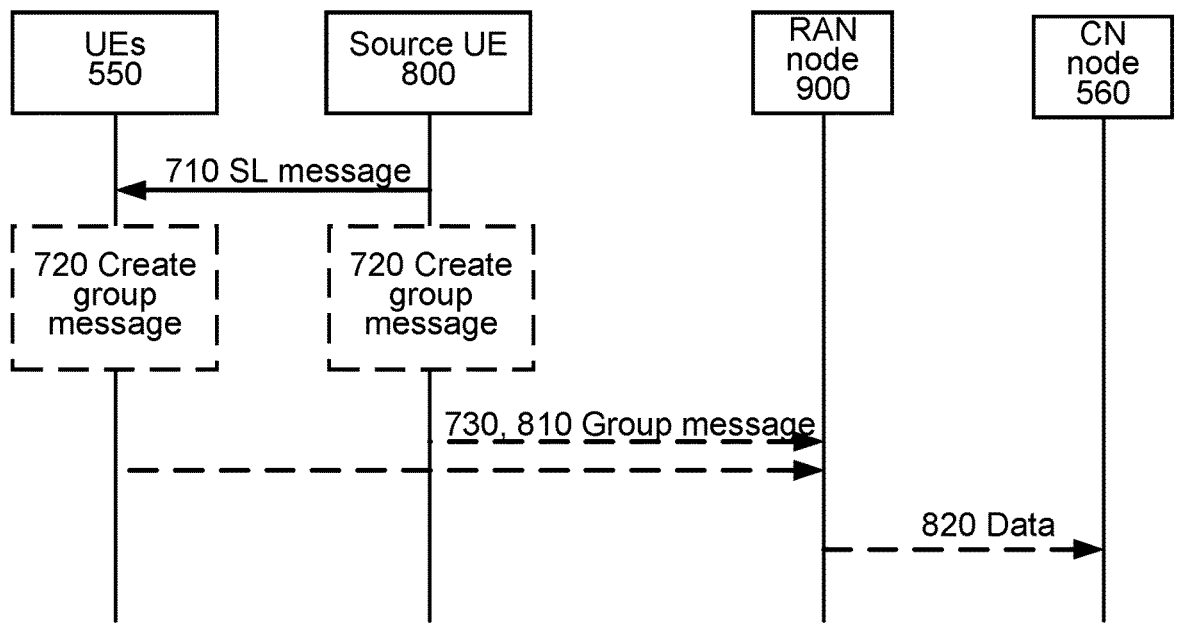
FIG. 5a is a message sequence chart of a process for group transmissions a wireless communications system.
Figure 6:
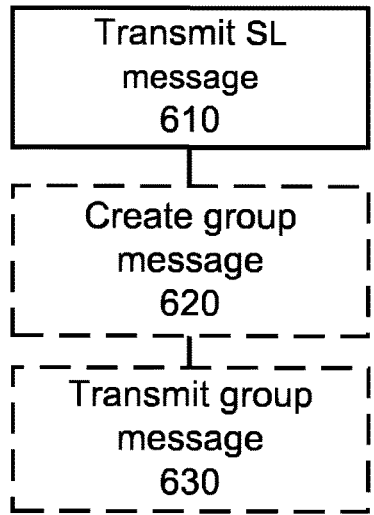
FIG. 6 is a flowchart of an example method performed by a source UE.

With reference to the FIGS. 5a and 6, a first embodiment will now be described. FIG. 5a illustrates a message sequence chart of a process for group transmissions in a wireless communications system. FIG. 6 illustrates a method 600 in a source UE 800 for group transmissions in a wireless communications system. The wireless communications system comprises a group of UEs 550, including the source UE 800. The group of UEs is assigned a first group IDentity (ID) 520. The source UE 800 has data to be cooperatively transmitted by the group of UEs in a group transmission to a Radio Access Network (RAN) node 900.

Figure 5B:
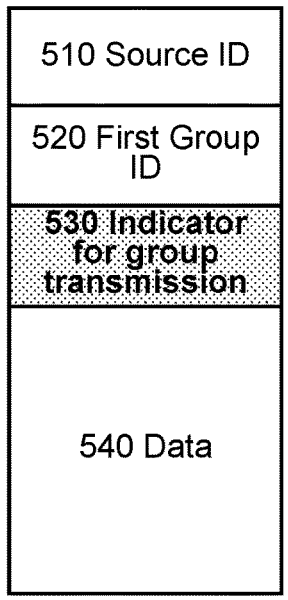
FIGS. 5b and 5c show an example embodiment of a SL message and a group message.

The method 600 comprises step 610 of transmitting, to the group of UEs, a SideLink (SL) message 500. An example of a SL message 500 is illustrated in FIG. 5b. The SL message 500 comprises the data 540 to be transmitted to the RAN node 900 and a source UE ID 510. The source UE ID 510 identifies the source UE 800, i.e. the UE that has the data that is to be transmitted. The SL message 500 further comprises the first group ID 520 identifying the group of UEs receiving the data. Thus, it is assumed that the group of UEs has already been established using the Proximity-based Services (ProSe) functionality previously described and that the first group ID 520 has been assigned to the group of UEs. With continuing reference to FIG. 5b, the SL message 500 further comprises an indicator 530. The indicator 530 indicates that the data 540 comprised in the SL message 500 is to be transmitted cooperatively by the group of UEs in a group transmission to the RAN node 900.

Accordingly, when the source UE 800 wants to transmit data to the RAN node 900, via the group of UEs, the source UE 800 informs the group of UEs that the transmitted data 540 is transmitted from a group member. This is performed by including the source UE ID 510 and the first group ID 520 in the SL message 500. This is similar to ProSe group communication. In addition to this, the source UE 800 also adds an indicator 530. The indicator 530 is a new field, which is illustrated as a dotted field in FIG. 5b. The indicator 530 indicates that the data 540 comprised in the SL message 500 is to be cooperatively transmitted to the network, i.e. to the RAN node 900, in a 2-hop group transmission. Thus, the method 600 according to the present disclosure enables handling of the identities of the source UE 800 and the group of UEs when performing group transmission such that 2-hop cooperative group transmissions are supported.

Figure 5C:
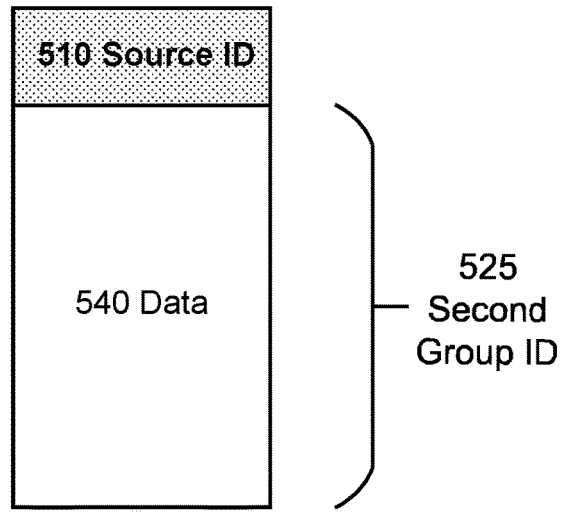

In some embodiments, the method 600 may further comprise step 620 of creating a group message 505. The group message 505 is created based on the SL message 500. FIG. 5c illustrates an example of a group message 505. The group message 505 is created by scrambling the data 540 comprised in the SL message 500 with a second group ID 525 identifying the group of UEs and adding the source UE ID 510 to the group message 505. The second group ID 525 may be, for example, a group Cell-Radio Network Temporary Identity (C-RNTI). In some embodiments, the second group ID 525 is the same identifier as the first group ID 520. The method 600 may further comprise step 630 of transmitting, cooperatively with the UEs assigned to the group, the group message to the RAN node 900. For example, the group message 505 may be transmitted to the RAN node 900 via a group bearer over a Uu interface.

Thus, the UEs within the group of UEs will receive the SL message 500 transmitted by the source UE 800. When the members of the group identify that the received data is transmitted from a UE within the group and that the data 540 shall be transmitted in a cooperative group transmission to the RAN node 900, each UE within the assigned group will create a group message 505. The group message 505 is created based on the SL message 500 and is created for the 2nd hop transmission to the RAN node 900. Thereafter, the group messages 505 may be transmitted cooperatively by the UEs within the assigned group to the RAN node 900.

The proposed solution differs from the ProSe relay assisted Device-to-Device (D2D) communication in that it does not transmit the source UEs part of the UE context via the relaying UE to the RAN node 900. Other major differences are that the transmissions are based on a second group ID 525, such as e.g. a group C-RNTI, used by one or many UEs simultaneously. Furthermore, the packets are relayed on L1-L3 level in the RAN. Thus, the packet may not be relayed on IP level.

In some embodiments, wherein the source UE 800 is in a connected mode, the source UE ID 510 may be a Prose UE ID. Alternatively, when the source UE 800 is in a connected mode, the source UE ID 510 may be the source UE's C-RNTI.

In other embodiments, wherein the source UE 800 is in an inactive mode, the source UE ID 510 may be a resume request ID. In these embodiments, it is assumed that other UEs within the group of UEs are in a connected mode.

In still other embodiments, the source UE 800 is out-of-coverage. Thus, the source UE 800 is not attached, or registered, to the wireless communications system and accordingly, the source UE 800 does not have any bearer setup. In these embodiments, the source UE ID 510 may be a Temporary Mobile Subscriber Identity (TMSI). The source UE 800 may have a TMSI if it has previously been connected to the same wireless communications system. With the TMSI, the source UE 800 may be identified in the core network. The benefit of using the TMSI is that the network may identify the source UE and do fairness and charging of the source UE 800.

According to a second aspect, there is provided a method 700 in a RAN node 900 for group transmissions in a wireless communications system.

Figure 7:
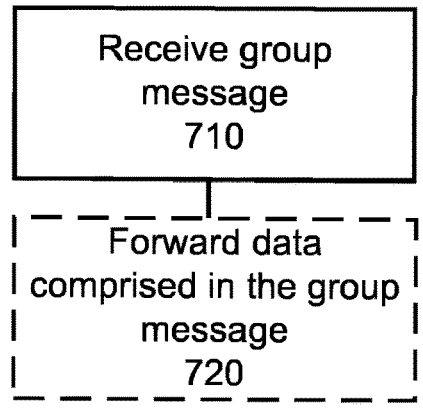
FIG. 7 is a flowchart of an example method performed by a RAN node.

With reference to the FIGS. 5a and 7, a first embodiment will now be described. As stated above, FIG. 5a illustrates a message sequence chart of a process for group transmissions in a wireless communications system. FIG. 7 illustrates a method 700 in a RAN node 900 for group transmissions in a wireless communications system. The wireless communications system comprises a group of UEs, including a source UE 800. In some embodiments, the group of UEs may be assigned a first group ID 520. The source UE 800 has data to be cooperatively transmitted by the group of UEs in a group transmission to the RAN node 900.

The method comprises step 710 of receiving group messages, from the UEs assigned to the group. An example of such a group message is illustrated in FIG. 5c. The group messages comprise data 540 scrambled with a second group ID 525 identifying the group of UEs and a source UE ID 510 identifying the source UE 800 of the received data.

Accordingly, the RAN node 900 receives group messages from several UEs in a cooperative group transmission, wherein all the UEs are assigned to the same group. Due to the format of the received group messages 505, the RAN node 900 is able to identify the source UE 800 of the received data. I.e. the RAN node 900 is able to identify which UE that is the source of the data received from the several UEs. Thus, the method 700 according to the present disclosure enables handling of the identities of the source UE 800 and the group of UEs when performing group transmission such that 2-hop cooperative group transmission is supported.

In some embodiments, the group messages, received from the UEs assigned to the group, may be received via a group radio bearer over a Uu interface.

In some embodiments, the method 700 may further comprise step 720 of forwarding, to a Core Network (CN) node 560, the data comprised in the received group messages 505. The CN node 560 may be, for example, a Serving GateWay (SGW) 565.

Figure 5D:
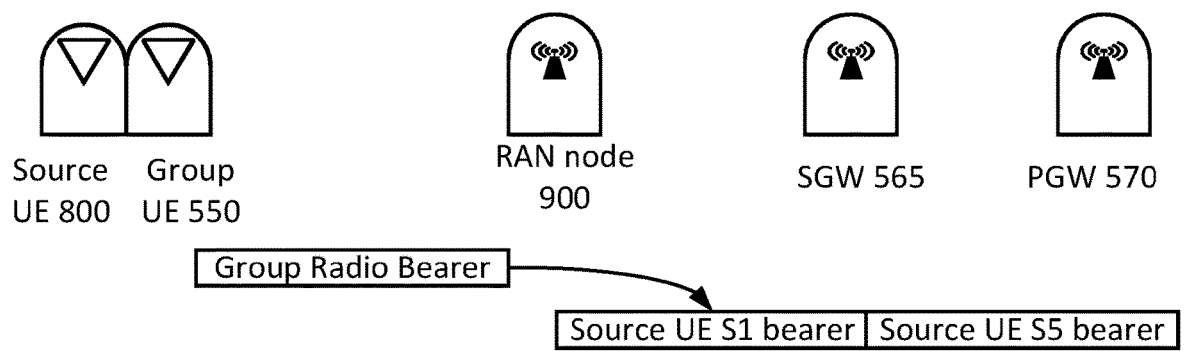
FIGS. 5d and 5e illustrate bearer handling with group transmissions.

In some embodiments, the source UE ID 510 is a resume request ID and indicates that the source UE 800 is in an active mode. In these embodiments, the received data 540 may be forwarded to the CN node 560 using the source UE's active bearers. Accordingly, the RAN node 900 may thus make a switch from the group bearer to the source UE's 800 own bearer. The RAN node 900 may use, for example, the source UE's bearers over S1 and S5 interfaces, or over N3 and N6 interfaces. An example of this is illustrated in FIG. 5d.

In other embodiments, the source UE ID 510 is a resume request ID and indicates that the source UE 800 is in an inactive mode. In these embodiments, the received data 540 may be forwarded to the CN node 560 using the source UE's active bearers. The RAN node 900 may use these bearers since they are still active when the UE is in an inactive mode. An example of this is illustrated in FIG. 5d. The RAN node 900 may use, for example, the source UE's bearers over S1 and S5 interfaces, or over N3 and N6 interfaces. Thereafter, the RAN node 900 may initiate a Radio Resource Control (RRC) resume procedure with the source UE 800.

Figure 5E:
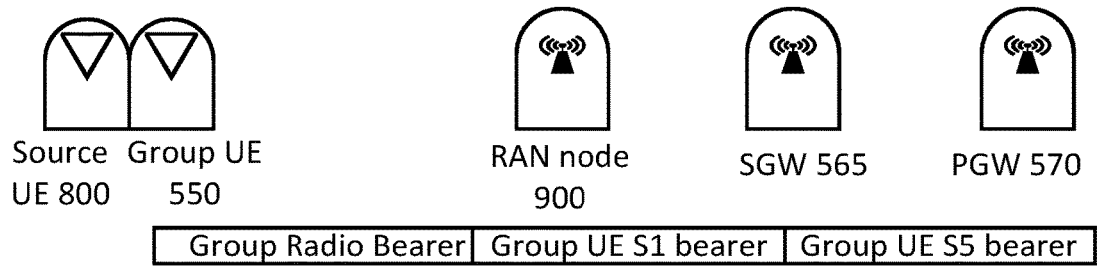

In still other embodiments, the source UE ID 510 is a TMSI and indicates that the source UE 800 is out-of-coverage. In these embodiments, the received data 540 may be forwarded to the CN node 560 using the group bearers. When the RAN node 900 receives group messages with a TMSI identifying the source UE 800, the RAN node 900 may identify the source UE 800 with the Access Management Function (AMF), the Session Management Function (SMF) or the Mobility Management Entity (MME). Since the source UE 800 does not have any bearers set up, the group bearers may be used also in the core network all the way to the PGW. An example of this is illustrated in FIG. 5e. After the PGW, the data may be further routed according to destination IP address.

According to a third aspect, there is provided a source UE 800 configured to perform the method 600 according to the first aspect.

Figure 8:
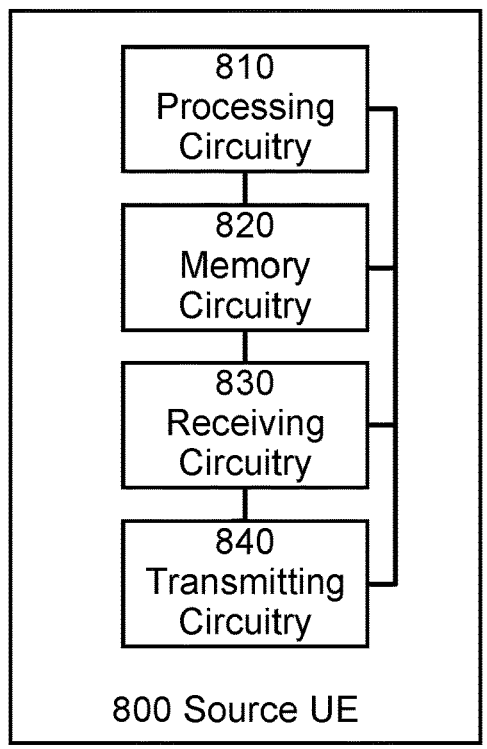
FIG. 8 shows an example implementation of a source UE.

The source UE 800 is now going to be described with reference to FIG. 8. The source UE 800 may be used in, but are not limited to, a wireless communication system. The wireless communications system comprises a group of UEs, including the source UE 800. The group of UEs is assigned a first group ID 520. The source UE 800 has data to be cooperatively transmitted by the group of UEs in a group transmission to a RAN node 900.

The source UE 800 is configured for group transmissions in a wireless communications system. As illustrated in FIG. 8, the source UE 800 comprises a processor, or a processing circuitry 810, and a memory, or a memory circuitry 820.

Additionally, or alternatively, the source UE 800 may further comprise a transmitter, or a transmitting circuitry 840, configured to transmit data to other apparatuses, such as the RAN node 900.

Additionally, or alternatively, the source UE 800 may further comprise a receiver, or a receiving circuitry 830, configured to receive data from other apparatuses, such as the RAN node 900.

The memory circuit 820 stores computer program code which, when run in the processing circuitry 810, causes the source UE 800 to transmit, to the group of UEs, a SL message 500. The SL message 500 comprises the data 540 to be transmitted to the RAN node 900 and a source UE ID 510 identifying the source UE 800. The SL message further comprises the first group ID 520 identifying the group of UEs receiving the data and an indicator 530. The indicator 530 indicates to the group of UEs that the data 540 comprised in the SL message 500 is to be transmitted cooperatively by the group of UEs in a group transmission to the RAN node 900. FIG. 5b illustrates an example of such SL message 500.

Thus, the source UE 800 according to the present disclosure enables handling of the identities of the source UE 800 and the group of UEs when performing group transmission in a wireless communications system. When the UEs within a group of UEs receive an SL message 500, they may identify that the message is initiated by the source UE 800 for being further transmitted by a cooperative group transmission to the RAN node 900. Thus, the proposed solution enables 2-hop cooperative group transmissions to be performed.

In some embodiments, the memory circuitry 820 storing computer program code which, when run in the processing circuitry 810, may further cause the source UE 800 to create a group message 505 based in the SL message 500. The group message 505 is created by scrambling the data 540 comprised in the SL message 500 with a second group ID 520 identifying the group of UEs and adding the source UE ID 510 to the group message 505. The second group ID 525 may be, for example, a group C-RNTI. In some embodiments, the first group ID 520 and the second group ID 525 may be the same group IDs. FIG. 5c illustrates an example of a group message 525. The source UE 800 may further be caused to transmit, cooperatively with the UEs assigned to the group, the group message 505 to the RAN node 900. The group message 505 may be transmitted to the RAN node via, for example, a group radio bearer over a Uu interface.

In some embodiments, when the source UE 800 is in a connected mode, the source UE ID 510 may be a Prose UE ID. Alternatively, the source UE ID 510 may be the source UE's C-RNTI.

In some embodiments, when the source UE 800 is in an inactive mode, the source UE ID 510 may be a resume request ID.

In some embodiments, when the source UE 800 is out-of-coverage and the source UE 800 does not have any bearer setup, the source UE ID 510 may be a TMSI.

According to a fourth aspect, there is provided a RAN node 900 for implementing the method 700 according to the second aspect.

Figure 9:
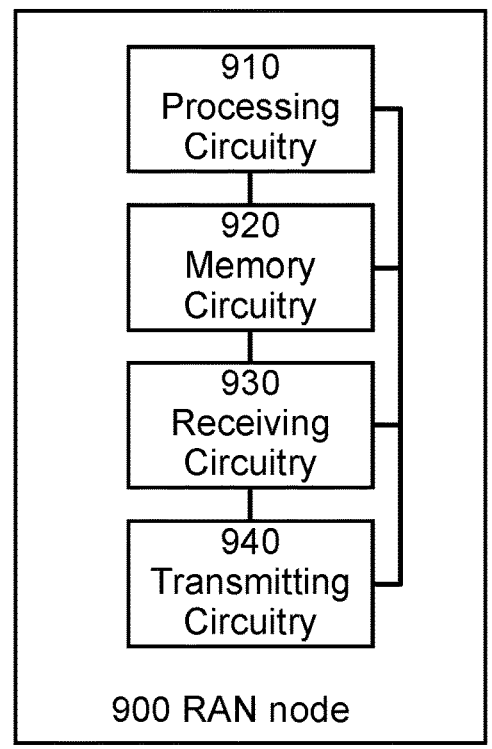
FIG. 9 shows an example implementation of a RAN node.

The RAN node 900 is now going to be described with reference to FIG. 9. The RAN node 900 may be used in, but are not limited to, wireless communications system. The wireless communications system comprises a group of UEs, including a source UE 800. In some embodiments, the group of UEs may be assigned a first group ID. The source UE 800 has data to be cooperatively transmitted by the group of UEs in a group transmission to the RAN node 900.

The RAN node 900 is configured for for group transmissions in a wireless communications system. As illustrated in FIG. 9, the RAN node 900 comprises a processor, or a processing circuitry 910, and a memory, or a memory circuitry 920.

Additionally, or alternatively, the RAN node 900 may further comprise a transmitter, or a transmitting circuitry 940, configured to transmit data to other apparatuses, such as the source UE 800.

Additionally, or alternatively, the RAN node 900 may further comprise a receiver, or a receiving circuitry 930, configured to receive data from other apparatuses, such as the source UE 800.

The memory circuitry 920 stores computer program code which, when run in the processing circuitry 910, causes the RAN node 900 to receive group messages 505, from the UEs assigned to the group. The group messages 505 comprise data 540 scrambled with a second group ID 525 identifying the group of UEs and a source UE ID 510 identifying the source UE 800 of the received data. An example of such group message 505 is illustrated in FIG. 5c.

Thus, the RAN node 900 according to the present disclosure is able to identify the source UE 800 which has initiated the cooperative group transmission to the RAN node 900. The identities of the source UE 800 and the group of UEs may thus be handled when performing group transmissions and 2-hop cooperative group transmissions may be supported.

In some embodiments, the group messages 505, received from the UEs assigned to the group, may be received via a group radio bearer over a Uu interface.

In some embodiments, the memory circuitry 920 storing computer program code which, when run in the processing circuitry 910, may further cause the RAN node 900 to forward, to a CN node 560, the data comprised in the received group messages.

In some embodiments, the source UE ID 510 indicates that the source UE 800 is in a connected mode. Then, the received data 540 may be forwarded to the CN node 560 using the source UE's bearers. An example of this is illustrated in FIG. 5d. The RAN node 900 may use, for example, the source UE's bearers over S1 and S5 interfaces, or over N3 and N6 interfaces.

In other embodiments, the source UE ID 510 may be a resume request ID and indicates that the source UE 800 is in an inactive mode. Then the received data 540 may forwarded to the CN node 560 using the source UE's active bearers. The RAN node 900 may use, for example, the source UE's bearers over S1 and S5 interfaces, or over N3 and N6 interfaces.

In still other embodiments, the source UE ID 510 may be a TMSI and indicates that the source UE 800 is out-of-coverage. Then the received data 540 may forwarded to the CN node 560 using the group bearers. The RAN node 900 may use, for example, the group bearers over S1 and S5 interfaces, or over N3 and N6 interfaces. An example of this is illustrated in FIG. 5e.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

Figure 10:
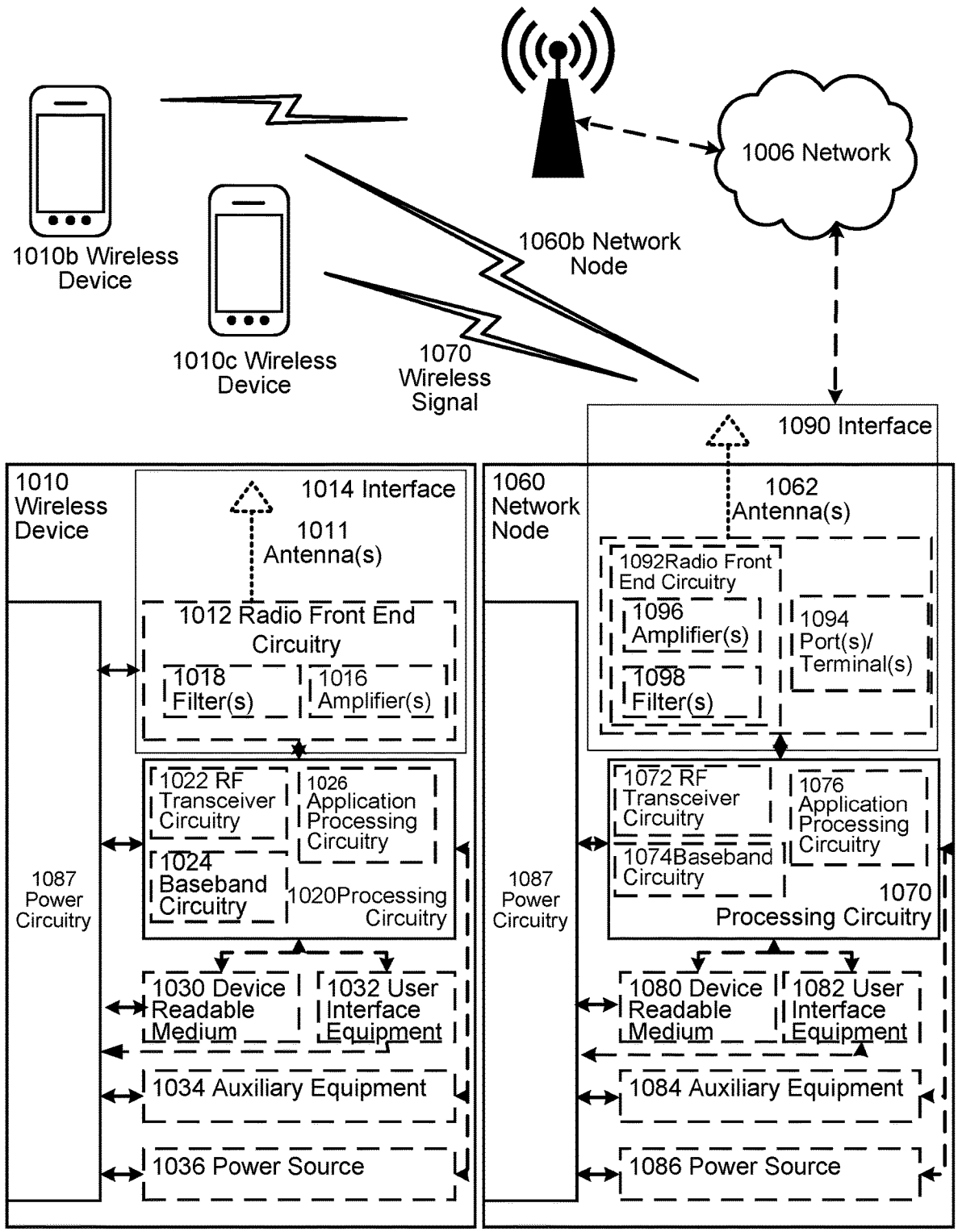
FIG. 10 illustrates an example wireless network.

Although the subject matter described herein may be implemented in any appropriate type of system using any suitable components, the embodiments described herein relate to a wireless network, such as the example wireless communication network illustrated in FIG. 10. For simplicity, the wireless communication network of FIG. 10 only depicts network 1006, network nodes 1060 and 1060b, and Wireless Devices (WDs) 1010, 1010b, and 1010c. The wireless communication network may further include any additional elements suitable to support communication between wireless devices or between a wireless device and another communication device, such as a landline telephone. Of the illustrated components, network node 1060 and wireless device (WD) 1010 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, network node 1060 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 10, Network node 1060 includes processing circuitry 1070, device readable medium 1080, interface 1090, user interface equipment 1082, auxiliary equipment 1084, power source 1086, power circuitry 1087, and antenna 1062. Although network node 1060 illustrated in the example wireless communication network of FIG. 10 may represent a device that includes the illustrated combination of hardware components, other embodiments may comprise network nodes with different combinations of components. It is to be understood that a network node may comprise any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be provided by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 10100 may be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1013 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1013 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
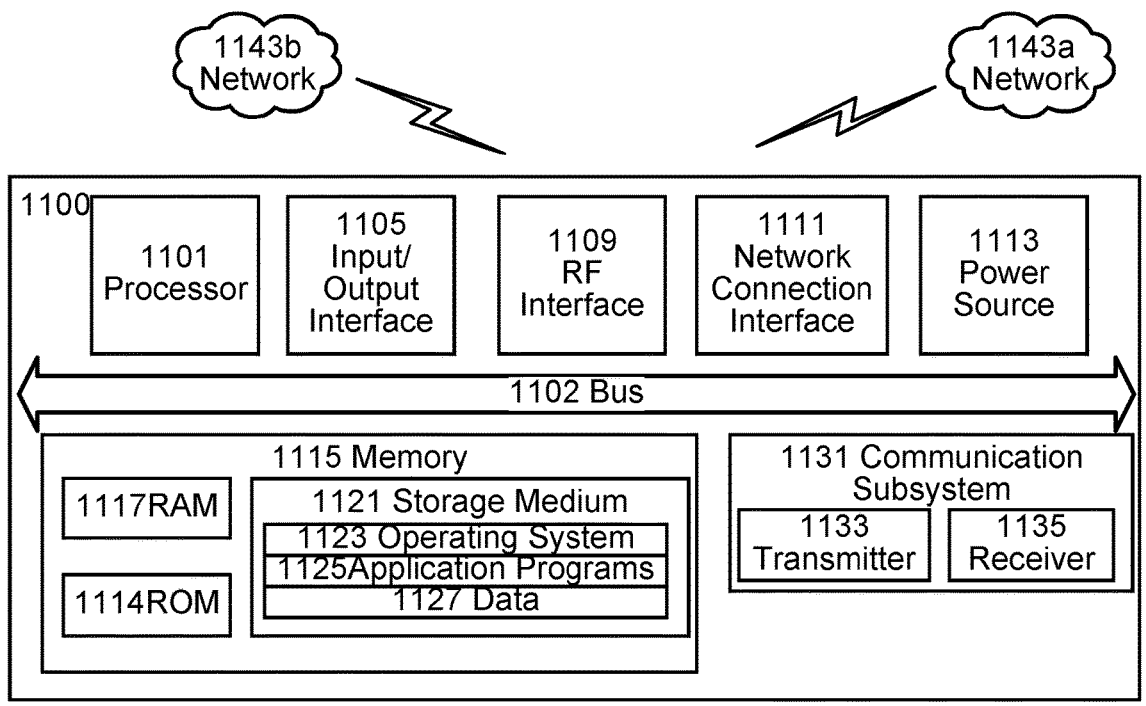
FIG. 11 shows a user equipment according to an embodiment.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1114, and storage medium 1121 or the like, communication subsystem 1131, power source 1113, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1114 may be configured to provide computer instructions or data to processing circuitry 1101. For example, ROM 1114 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power 5 source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
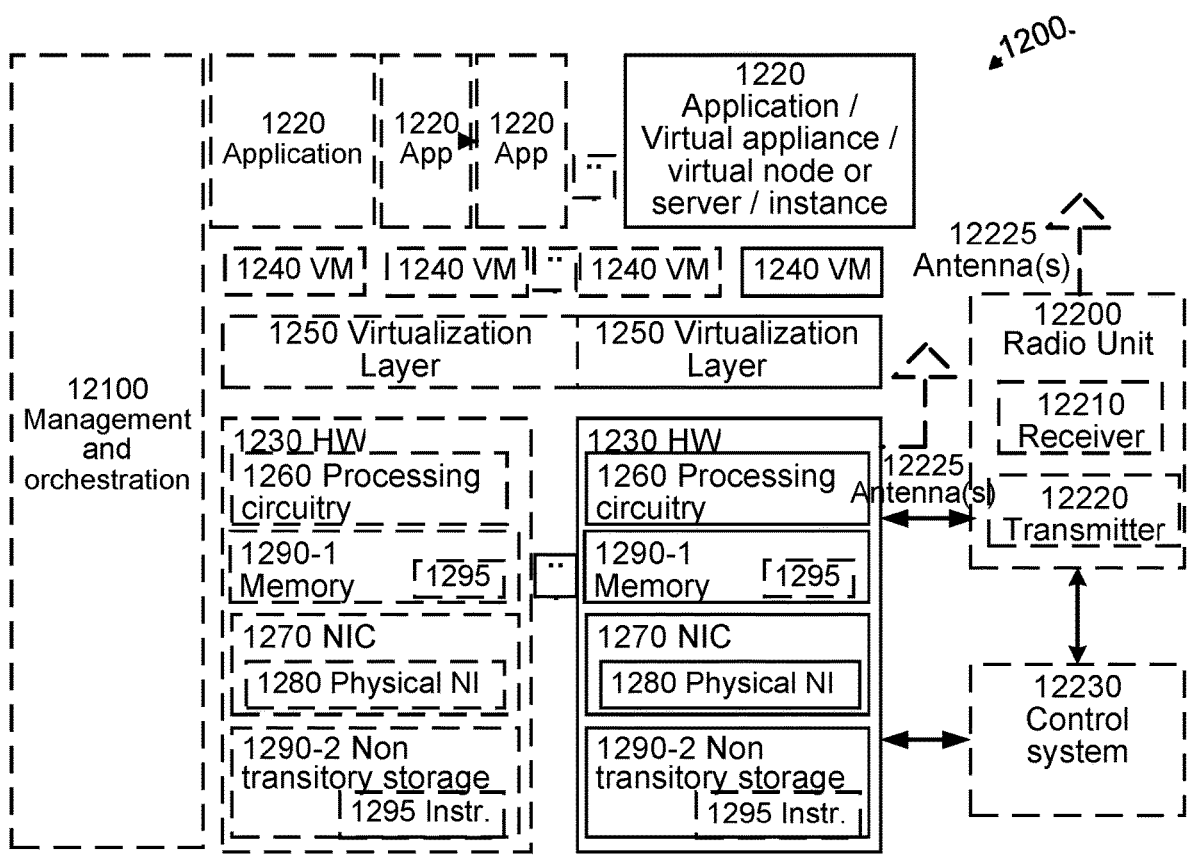
FIG. 12 shows a virtualization environment according to an embodiment.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analogue hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be affected with the use of control system 12230 which may alternatively be used for communication between the hardware nodes 1230 and radio units 12200.

Figure 13:
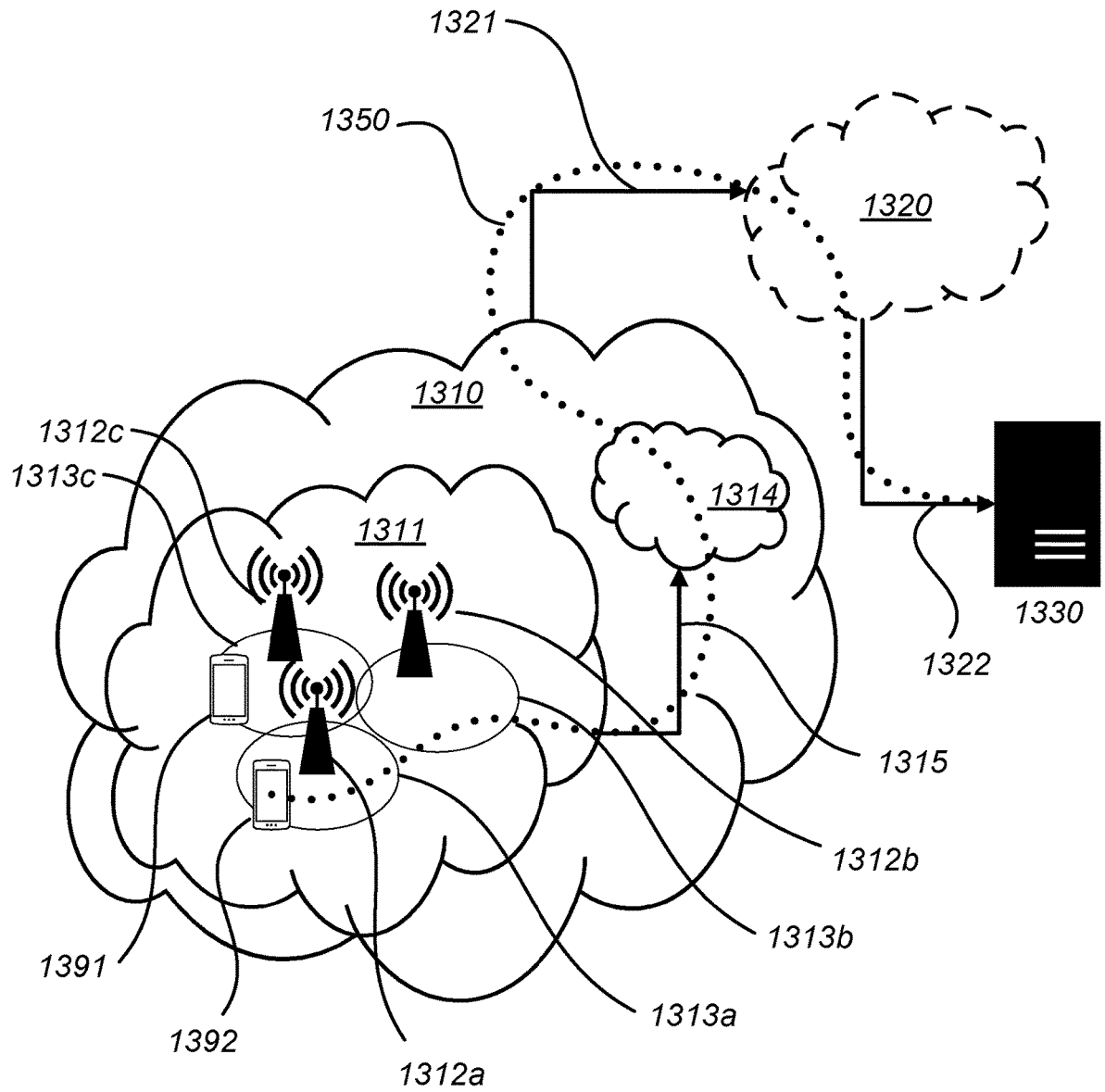
FIG. 13 illustrates an example telecommunication network connected via an intermediate network to a host computer.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1316 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct, or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
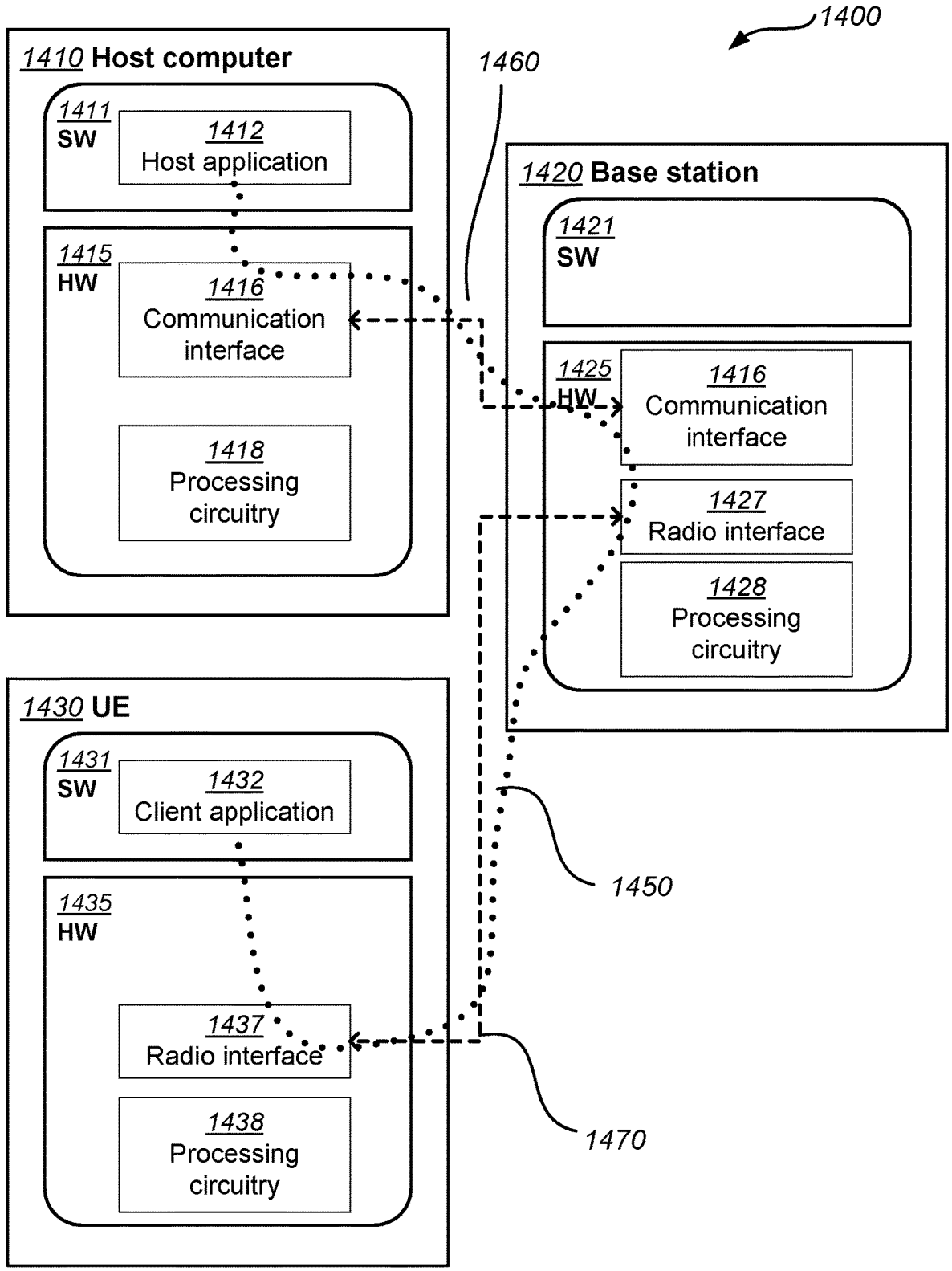
FIG. 14 shows a host computer communicating via a base station with a user equipment over a partially wireless connection according to an embodiment.

It is noted that host computer 1410, base station 1420 and UE 1430 illustrated in FIG. 14 may be similar or identical to host computer 1430, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the data rate and thereby provide benefits such as better responsiveness.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figures 15, 16:
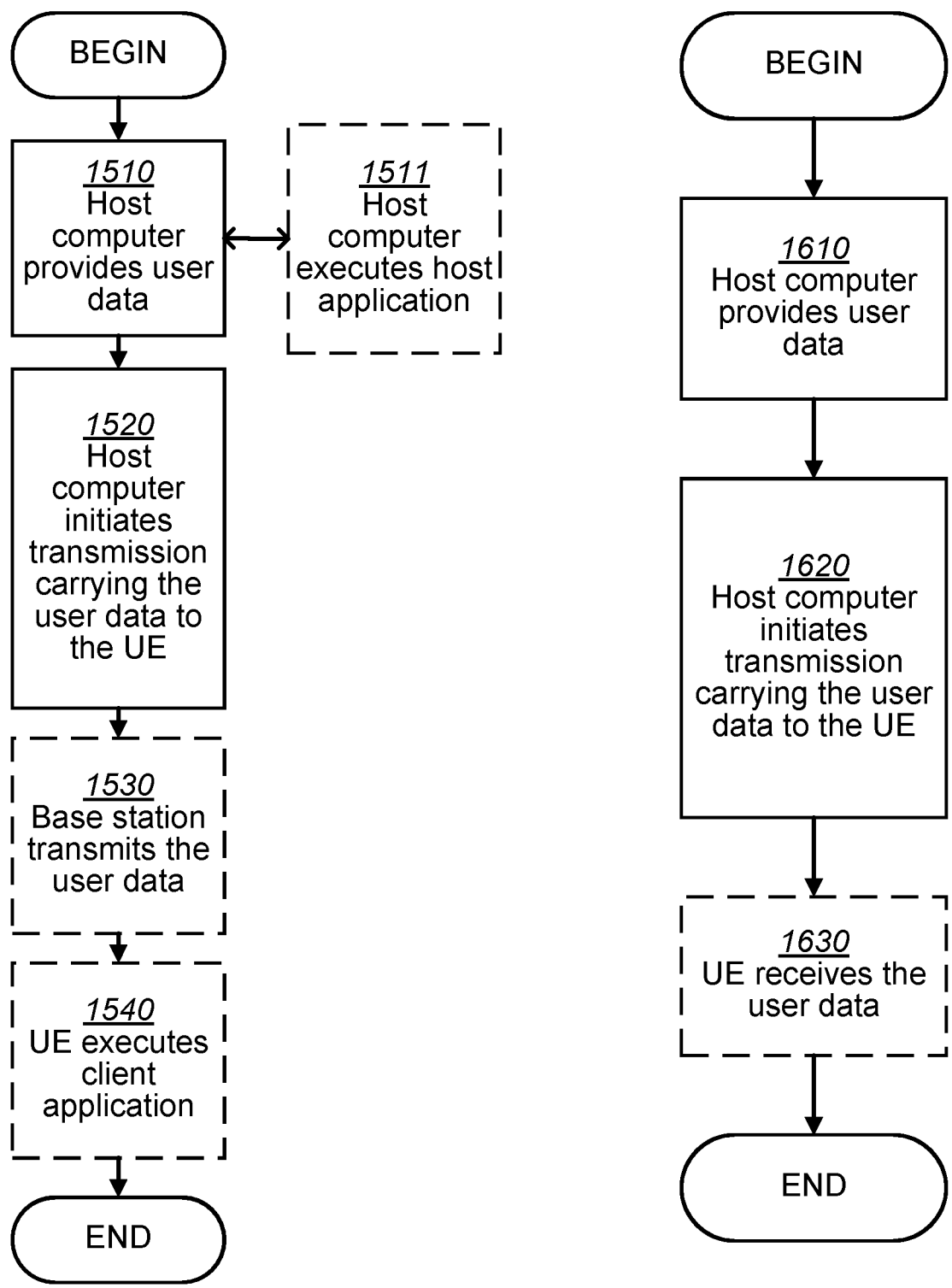
FIGS. 15 and 16 show example methods implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

NUMBERED EMBODIMENTS IN PARTICULAR RELATED TO FIGS. 10-18

1. A Radio Access Network (RAN) node configured to communicate with a source User Equipment (UE), the RAN node comprising a radio interface and processing circuitry configured to:
   receive group messages, from the UEs assigned to the group, wherein the group messages comprise data scrambled with a second group ID identifying the group of UEs and a source UE ID identifying the source UE of the received data.
2. The RAN node according to embodiment 1, wherein the group messages, received from the UEs assigned to the group, are received via a group radio bearer over a Uu interface.
3. The RAN node according to any of embodiments 1 and 2, wherein the RAN node further is configured to:
   forward, to a Core Network (CN) node, the data comprised in the received group messages.
4. The RAN node according to embodiment 3, wherein the source UE ID indicates that the source UE is in a connected mode and the received data is forwarded to the CN node using the source UE's bearers.
5. The RAN node according to embodiment 3, wherein the source UE ID is a resume request ID and indicates that the source UE is in an inactive mode, the received data is forwarded to the CN node (500) using the source UE's active bearers
6. The RAN node according to embodiment 3, wherein the source UE ID is a Temporary Mobile Subscriber Identity (TMSI) and indicates that the source UE is in out-of-coverage, the received data is forwarded to the CN node using the group bearer
7. A communication system including a host computer comprising:
   processing circuitry configured to provide user data; and
   a communication interface configured to forward the user data to a cellular network for transmission to a source User Equipment (UE),
   wherein the cellular network comprises a Radio Access Network (RAN) node having a radio interface and processing circuitry, the RAN node's processing circuitry configured to receive group messages, from the UEs assigned to the group, wherein the group messages comprise data scrambled with a second group ID identifying the group of UEs and a source UE ID identifying the source UE of the received data.
8. The communication system of embodiment 7, further including the RAN node.
9. The communication system of embodiment 8, further including the source UE, wherein the source UE is configured to communicate with the RAN node.
10. The communication system of embodiment 9, wherein:
the processing circuitry of the host computer is configured to execute a host application, thereby providing the user data; and
the source UE comprises processing circuitry configured to execute a client application associated with the host application.
11. A method implemented in a Radio Access Network (RAN) node, comprising
receiving group messages, from the UEs assigned to the group, wherein the group messages comprise data scrambled with a second group ID identifying the group of UEs and a source UE ID identifying the source UE of the received data.
12. A method implemented in a communication system including a host computer, a Radio Access Network (RAN) node and a source User Equipment (UE), the method comprising:
at the host computer, providing user data; and
at the host computer, initiating a transmission carrying the user data to the source UE via a cellular network comprising the RAN node, wherein the RAN node
receiving group messages, from the UEs assigned to the group, wherein the group messages comprise data scrambled with a second group ID identifying the group of UEs and a source UE ID identifying the source UE of the received data.
13. The method of embodiment 12, further comprising:
at the RAN node, transmitting the user data.
14. The method of embodiment 13, wherein the user data is provided at the host computer by executing a host application, the method further comprising:
at the UE, executing a client application associated with the host application.
15. A source User Equipment (UE) configured to communicate with a Radio Access Network (RAN) node, the source UE comprising a radio interface and processing circuitry configured to transmit and receive data to and from the RAN node.
16. A communication system including a host computer comprising:
processing circuitry configured to provide user data; and
a communication interface configured to forward user data to a cellular network for transmission to a source User Equipment (UE),
wherein the source UE comprises a radio interface and processing circuitry, the source UE's processing circuitry configured to transmit and receive data to and from a Radio Access Network (RAN) node.
17. The communication system of embodiment 16, further including the source UE.
18. The communication system of embodiment 17, wherein the cellular network further includes a RAN node configured to communicate with the source UE.
19. The communication system of embodiment 17 or 18, wherein:
the processing circuitry of the host computer is configured to execute a host application, thereby providing the user data; and the source UE's processing circuitry is configured to execute a client application associated with the host application.
20. A method implemented in a communication system including a host computer, a Radio Access Network (RAN) node and a source User Equipment (UE), the method comprising:
at the host computer, providing user data; and
at the host computer, initiating a transmission carrying the user data to the source UE via a cellular network comprising the RAN node, wherein the source UE transmits and receives to and from the RAN node.
21. The method of embodiment 20, further comprising:
at the source UE, receiving the user data from the RAN node.
22. A communication system including a host computer comprising:
a communication interface configured to receive user data originating from a transmission from a source User Equipment (UE) to a Radio Access Network (RAN) node, wherein the source UE comprises a radio interface and processing circuitry, the source UE's processing circuitry configured to transmit and receive data to and from the RAN node.
23. The communication system of embodiment 22, further including the source UE.
24. The communication system of embodiment 23, further including the RAN node, wherein the RAN node comprises a radio interface configured to communicate with the source UE and a communication interface configured to forward to the host computer the user data carried by a transmission from the source UE to the RAN node.
25. The communication system of embodiment 23 or 24, wherein:
the processing circuitry of the host computer is configured to execute a host application;
and the source UE's processing circuitry is configured to execute a client application associated with the host application, thereby providing the user data.
26. The communication system of embodiment 24 or 25, wherein:
the processing circuitry of the host computer is configured to execute a host application, thereby providing request data; and
the source UE's processing circuitry is configured to execute a client application associated with the host application, thereby providing the user data in response to the request data.
27. A method implemented in a source User Equipment (UE), comprising transmitting and receiving data to and from a Radio Access Network (RAN) node.
28. The method of embodiment 27, further comprising:
providing user data; and
forwarding the user data to a host computer via the transmission to the RAN node.
29. A method implemented in a communication system including a host computer, a Radio Access Network (RAN) node and a source User Equipment (UE), the method comprising:
at the host computer, receiving user data transmitted to the RAN node from the UE, wherein the source UE transmitting and receiving data to and from the RAN node.
30. The method of embodiment 29 further comprising:
at the source UE, providing the user data to the RAN node.

31. The method of embodiment 30, further comprising:
at the source UE, executing a client application, thereby providing the user data to be transmitted; and
at the host computer, executing a host application associated with the client application.

32. The method of embodiment 31, further comprising:
at the source UE, executing a client application; and
at the source UE, receiving input data to the client application, the input data being provided at the host computer by executing a host application associated with the client application,
wherein the user data to be transmitted is provided by the client application in response to the input data.

33. A communication system including a host computer comprising a communication interface configured to receive user data originating from a transmission from a source User Equipment (UE) to a Radio Access Network (RAN) node, wherein the RAN node comprises a radio interface and processing circuitry, the RAN node's processing circuitry configured to receive group messages, from the UEs assigned to the group, wherein the group messages comprise data scrambled with a second group ID identifying the group of UEs and a source UE ID identifying the source UE of the received data.

34. The communication system of embodiment 33, further including the RAN node.

35. The communication system of embodiment 34, further including the source UE, wherein the source UE is configured to communicate with the RAN node.

36. The communication system of embodiment 36, wherein:
the processing circuitry of the host computer is configured to execute a host application;
the source UE is configured to execute a client application associated with the host application, thereby providing the user data to be received by the host computer.

37. A method implemented in a communication system including a host computer, a Radio Access Network (RAN) node and a source User Equipment (UE), the method comprising:
at the host computer, receiving, from the RAN node, user data originating from a transmission which the RAN node has received from the source UE, wherein the source UE transmits and receives data to and from the RAN node.

38. The method of embodiment 37, further comprising:
at the RAN node, receiving the user data from the source UE.

39. The method of embodiment 38, further comprising:
at the RAN node, initiating a transmission of the received user data to the host computer.

40. A source User Equipment (UE) configured to communicate with a Radio Access Network (RAN) node, the source UE comprising a radio interface and processing circuitry configured to:
transmit, to the group of UEs, a SideLink (SL) message, wherein the SL message comprises the data to be transmitted to the RAN node, a source UE ID identifying the source UE, a first group ID identifying the group of UEs receiving the data and an indicator indicating that the data comprised in the SL message is to be transmitted cooperatively by the group of UEs in a group transmission to the RAN node.

41. The source UE according to embodiment 41, wherein source UE further is configure to:
create a group message, based on the SL message, wherein the group message is created by scrambling the data comprised in the SL message with a second group ID identifying the group of UEs and adding the source UE ID to the group message; and
transmit, cooperatively with the UEs assigned to the group, the group message to the RAN node.

42. The source UE according to any of embodiments 40 and 41, wherein the group message is transmitted to the RAN node via a group radio bearer over a Uu interface.

43. The source UE according to any of embodiments 40 to 42, wherein the source UE is in a connected mode and the source UE ID is a Prose UE ID or the source UE's Cell-Radio Network Temporary Identity (C-RNTI).

44. The source UE according to any of embodiments 40 to 42, wherein the source UE is in an inactive mode and the source UE ID is a resume request ID.

45. The source UE according to any of embodiments 44 to 45, wherein the source UE is out-of-coverage and the source UE does not have any bearer setup, the source UE ID is a Temporary Mobile Subscriber Identity (TMSI).

46. The source UE according to any of embodiments 40 to 45, wherein the group ID is a group C-RNTI.

47. A communication system including a host computer comprising:
processing circuitry configured to provide user data; and
a communication interface configured to forward the user data to a cellular network for transmission to a source User Equipment (UE), wherein the cellular network comprises a base station having a radio interface and processing circuitry, the base station's processing circuitry configured to transmit, to the group of UEs, a SideLink (SL) message, wherein the SL message comprises the data to be transmitted to a RAN node, a source UE ID identifying the source UE, a first group ID identifying the group of UEs receiving the data and an indicator indicating that the data comprised in the SL message is to be transmitted cooperatively by the group of UEs in a group transmission to the RAN node.

48. The communication system of embodiment 47, further including the RAN node.

49. The communication system of embodiment 48, further including the source UE, wherein the source UE is configured to communicate with the RAN node.

50. The communication system of embodiment 49, wherein:
the processing circuitry of the host computer is configured to execute a host application, thereby providing the user data; and
the source UE comprises processing circuitry configured to execute a client application associated with the host application.

51. A method implemented in a source UE, comprising transmitting, to a group of UEs, a SideLink (SL) message, wherein the SL message comprises the data to be transmitted to the RAN node, a source UE ID identifying the source UE, a first group ID identifying the group of UEs receiving the data and an indicator indicating that the data comprised in the SL message is to be transmitted cooperatively by the group of UEs in a group transmission to the RAN node.

52. A method implemented in a communication system including a host computer, a source User Equipment (UE) and a Radio Access Network (RAN) node, the method comprising:
at the host computer, providing user data; and
at the host computer, initiating a transmission carrying the user data to the source UE via a cellular network comprising the source UE, wherein the source UE transmitting, to a group of UEs, a SideLink (SL) message, wherein the SL message comprises the data to be transmitted to the RAN node, a source UE ID identifying the source UE, a first group ID identifying the group of UEs receiving the data and an indicator indicating that the data comprised in the SL message is to be transmitted cooperatively by the group of UEs in a group transmission to the RAN node.

53. The method of embodiment 52, further comprising:
   at the source UE, transmitting the user data.
54. The method of embodiment 53, wherein the user data is provided at the host computer by executing a host application, the method further comprising:
   at the source UE, executing a client application associated with the host application.
55. A source User Equipment (UE) configured to communicate with a Radio Access Network (RAN) node, the source UE comprising a radio interface and processing circuitry configured to transmit and receive data to and from the RAN node.
56. A communication system including a host computer comprising:
   processing circuitry configured to provide user data; and
   a communication interface configured to forward user data to a cellular network for transmission to a source User Equipment (UE),
   wherein the source UE comprises a radio interface and processing circuitry, the source UE's processing circuitry configured to transmit and receive data to and from a Radio Access Network (RAN) node.
57. The communication system of embodiment 56, further including the source UE.
58. The communication system of embodiment 57, wherein the cellular network further includes a RAN node configured to communicate with the first source UE.
59. The communication system of embodiment 56 or 57, wherein:
   the processing circuitry of the host computer is configured to execute a host application, thereby providing the user data; and
   the source UE's processing circuitry is configured to execute a client application associated with the host application.
60. A method implemented in a communication system including a host computer, a first source User Equipment (UE) and Radio Access Network (RAN) node, the method comprising:
   at the host computer, providing user data; and
   at the host computer, initiating a transmission carrying the user data to the RAN node via a cellular network comprising the RAN node, wherein the source UE transmits and receives to and from the RAN node.
61. The method of embodiment 60, further comprising:
   at the source UE, receiving the user data from the RAN node.
62. A communication system including a host computer comprising:
   a communication interface configured to receive user data originating from a transmission from a source User Equipment (UE) to a Radio Access Network (RAN) node,
   wherein the source UE comprises a radio interface and processing circuitry, the source UE's processing circuitry configured to transmit and receive data to and from the RAN node.
63. The communication system of embodiment 62, further including the source UE.
64. The communication system of embodiment 63, further including the RAN node, wherein the RAN node comprises a radio interface configured to communicate with the source UE and a communication interface configured to forward to the host computer the user data carried by a transmission from the source UE to the RAN node.
65. The communication system of embodiment 63 or 64, wherein:
   the processing circuitry of the host computer is configured to execute a host application;
   and the source UE's processing circuitry is configured to execute a client application associated with the host application, thereby providing the user data.
66. The communication system of embodiment 64 or 65, wherein:
   the processing circuitry of the host computer is configured to execute a host application, thereby providing request data; and
   the source UE's processing circuitry is configured to execute a client application associated with the host application, thereby providing the user data in response to the request data.
67. A method implemented in a source User Equipment (UE), comprising transmitting and receiving data to and from a Radio Access Network (RAN) node.
68. The method of embodiment 67, further comprising:
   providing user data; and
   forwarding the user data to a host computer via the transmission to the RAN node.
69. A method implemented in a communication system including a host computer, a source User Equipment (UE) and a Radio Access Network (RAN) node, the method comprising:
   at the host computer, receiving user data transmitted to the RAN node from the source UE, wherein the source UE transmitting and receiving data to and from the RAN node.
70. The method of embodiment 69, further comprising:
   at the source UE, providing the user data to the RAN node.
71. The method of embodiment 70, further comprising:
   at the source UE, executing a client application, thereby providing the user data to be transmitted; and
   at the host computer, executing a host application associated with the client application.
72. The method of embodiment 71, further comprising:
   at the source UE, executing a client application; and
   at the source UE, receiving input data to the client application, the input data being provided at the host computer by executing a host application associated with the client application,
   wherein the user data to be transmitted is provided by the client application in response to the input data.
73. A communication system including a host computer comprising a communication interface configured to receive user data originating from a transmission from a source User Equipment (UE) to a Radio Access Network (RAN) node, wherein the source UE comprises a radio interface and processing circuitry, the source UE's processing circuitry configured to transmit, to the group of UEs, a SideLink (SL) message, wherein the SL message comprises the data to be transmitted to the RAN node, a source UE ID identifying the source UE, the group ID identifying the group of UEs receiving the data and an indicator indicating that the data comprised in the SL message is to be transmitted cooperatively by the group of UEs in a group transmission to the RAN node.

74. The communication system of embodiment 73, further including the RAN node.

75. The communication system of embodiment 74, further including the source UE, wherein the source UE is configured to communicate with the RAN node.

76. The communication system of embodiment 75, wherein:
the processing circuitry of the host computer is configured to execute a host application;
the source UE is configured to execute a client application associated with the host application, thereby providing the user data to be received by the host computer.

77. A method implemented in a communication system including a host computer, a source User Equipment (UE) and a Radio Access Network (RAN) node, the method comprising:
at the host computer, receiving, from the RAN node, user data originating from a transmission which the RAN node has received from the source UE, wherein the source UE transmits and receives data to and from the RAN node.

78. The method of embodiment 77, further comprising:
at the RAN node, receiving the user data from the source UE.

79. The method of embodiment 78, further comprising:
at the RAN node, initiating a transmission of the received user data to the host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method in a source User Equipment (UE), for group transmissions in a wireless communications system, wherein the wireless communications system comprises a group of UEs, including the source UE, which is assigned a first group Identity (ID), and wherein the source UE has data to be cooperatively transmitted by the group of UEs in a group transmission to a Radio Access Network (RAN) node, the method comprising:
transmitting, to the group of UEs, a SideLink (SL) message, wherein the SL message comprises the data to be transmitted to the RAN node, a source UE ID identifying the source UE, the first group ID identifying the group of UEs receiving the data and an indicator indicating that the data comprised in the SL message is to be transmitted cooperatively by the group of UEs in a group transmission to the RAN node;
creating a group message, based on the SL message, wherein the group message is created by scrambling the data comprised in the SL message with a second group ID identifying the group of UEs and adding the source UE ID to the group message; and
transmitting, cooperatively with the UEs assigned to the group, the group message to the RAN node.

2. The method according to claim 1, wherein the group message is transmitted to the RAN node via a group radio bearer over a Uu interface.

3. The method according to claim 1, wherein the source UE is in a connected mode, and wherein the source UE ID is a Prose UE ID or the source UE ID is the source UE's Cell-Radio Network Temporary Identity (C-RNTI).

4. The method according to claim 1, wherein the source UE is in an inactive mode and the source UE ID is a resume request ID.

5. The method according to claim 1, wherein the source UE is out-of-coverage and the source UE does not have any bearer setup, and wherein the source UE ID is a Temporary Mobile Subscriber Identity (TMSI).

6. The method according to claim 1, wherein the second group ID is a group C-RNTI.

7. A source User Equipment (UE) configured for group transmissions in a wireless communications system, wherein the wireless communications system comprises a group of UEs, including the source UE, which is assigned a first group Identity (ID), and wherein the source UE has data to be cooperatively transmitted by the group of UEs in a group transmission to a Radio Access Network (RAN) node, wherein the source UE comprises:
a processing circuitry; and
a memory circuitry storing computer program code which, when run in the processing circuitry, causes the source UE to:
transmit, to the group of UEs, a SideLink (SL) message, wherein the SL message comprises the data to be transmitted to the RAN node, a source UE ID identifying the source UE, the first group ID identifying the group of UEs receiving the data and an indicator indicating that the data comprised in the SL message is to be transmitted cooperatively by the group of UEs in a group transmission to the RAN node;
create a group message, based on the SL message, wherein the group message is created by scrambling the data comprised in the SL message with a second group ID identifying the group of UEs and adding the source UE ID to the group message; and
transmit, cooperatively with the UEs assigned to the group, the group message to the RAN node.

8. The source UE of claim 7, wherein the memory circuitry stores computer program code which, when run in the processing circuitry, causes the source UE to transmit the group message the RAN node via a group radio bearer over a Uu interface.

9. The source UE of claim 7, wherein the memory circuitry stores computer program code which, when run in the processing circuitry, causes the source UE to transmit the SL message when the source UE is in a connected mode, and wherein the source UE ID is a Prose UE ID or the source UE ID is the source UE's Cell-Radio Network Temporary Identity (C-RNTI).

10. The source UE of claim 7, wherein the memory circuitry stores computer program code which, when run in the processing circuitry, causes the source UE to transmit the SL message when the source UE is in an inactive mode, wherein the source UE ID is a resume request ID.

11. The source UE of claim 7, wherein the memory circuitry stores computer program code which, when run in the processing circuitry, causes the source UE to transmit the SL message when the source UE is out-of-coverage and the source UE does not have any bearer setup, and wherein the source UE ID is a Temporary Mobile Subscriber Identity (TMSI).

* * * * *